(12) United States Patent
Bauer et al.

(10) Patent No.: US 10,590,821 B2
(45) Date of Patent: Mar. 17, 2020

(54) METHOD FOR CHECKING THE FUNCTION OF AT LEAST ONE PTC HEATING ELEMENT

(71) Applicant: CONTINENTAL AUTOMOTIVE GMBH, Hannover (DE)

(72) Inventors: Peter Bauer, Immenreuth (DE); Jan Hodgson, Troisdorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/314,231

(22) PCT Filed: Jun. 2, 2015

(86) PCT No.: PCT/EP2015/062291
§ 371 (c)(1),
(2) Date: Nov. 28, 2016

(87) PCT Pub. No.: WO2015/185569
PCT Pub. Date: Dec. 10, 2015

(65) Prior Publication Data
US 2017/0191392 A1    Jul. 6, 2017

(30) Foreign Application Priority Data
Jun. 4, 2014    (DE) .................. 10 2014 107 863

(51) Int. Cl.
*F01N 3/20*    (2006.01)
(52) U.S. Cl.
CPC ............. *F01N 3/206* (2013.01); *F01N 3/208* (2013.01); *F01N 3/2066* (2013.01);
(Continued)

(58) Field of Classification Search
USPC .......... 60/274, 276, 277, 286, 297, 301, 303
See application file for complete search history.

(56) References Cited

U.S. PATENT DOCUMENTS

| 8,088,336 | B2 | 1/2012 | Suzuki et al. |
| 8,448,426 | B2 * | 5/2013 | Peucat ................ F01N 3/208 60/295 |

(Continued)

FOREIGN PATENT DOCUMENTS

| CN | 101809258 A | 8/2010 |
| CN | 102713184 A | 10/2012 |

(Continued)

OTHER PUBLICATIONS

International Search Report and Written Opinion dated Jul. 29, 2015 from corresponding International Patent Application No. PCT/EP2015/062291.

(Continued)

*Primary Examiner* — Binh Q Tran

(57) ABSTRACT

The invention relates to a method for checking the function of at least one PTC heating element which is used in a device for providing a liquid additive. The at least one PTC heating element is connected to a voltage source via electric conductors. According to the method, a starting current with a first value is provided at a specified operating voltage in a step a). Then, in a step b), a monitoring process is carried out in order to determine whether the starting current with the first value is provided for a minimum duration, said minimum duration having a value of at least seconds. The method is used in particular for on-board diagnoses of a device for providing a liquid additive.

9 Claims, 2 Drawing Sheets

(52) U.S. Cl.
CPC ...... *F01N 2550/05* (2013.01); *F01N 2610/02* (2013.01); *F01N 2610/10* (2013.01); *F01N 2610/105* (2013.01); *F01N 2610/1406* (2013.01); *F01N 2900/1811* (2013.01); *Y02A 50/2325* (2018.01); *Y02T 10/24* (2013.01)

(56) References Cited

U.S. PATENT DOCUMENTS

| | | | |
|---|---|---|---|
| 8,680,437 B2 * | 3/2014 | Starck | F01N 3/2066 219/205 |
| 8,756,919 B2 | 6/2014 | Hodgson et al. | |
| 8,822,887 B2 | 9/2014 | Koonce | |
| 8,826,648 B2 * | 9/2014 | Baumeister | F01N 3/208 60/295 |
| 9,279,354 B2 * | 3/2016 | Yoshida | F01N 3/208 |
| 9,582,013 B2 * | 2/2017 | Naydenov | F01N 3/208 |
| 2004/0226285 A1 * | 11/2004 | Gomulka | F01N 3/2066 60/286 |
| 2007/0079599 A1 * | 4/2007 | Osaku | F01N 3/2066 60/283 |
| 2007/0157602 A1 * | 7/2007 | Gschwind | B60K 15/00 60/274 |
| 2008/0260597 A1 | 10/2008 | Suzuki et al. | |
| 2010/0050606 A1 * | 3/2010 | Fulks | F01N 3/2066 60/286 |
| 2010/0078426 A1 | 4/2010 | Li et al. | |
| 2010/0186374 A1 | 7/2010 | Peucat et al. | |
| 2011/0210836 A1 | 9/2011 | Baumeister | |
| 2012/0031084 A1 | 2/2012 | Perrin | |
| 2012/0103433 A1 | 5/2012 | Koonce | |
| 2012/0321525 A1 | 12/2012 | Maus et al. | |
| 2013/0239554 A1 | 9/2013 | Gonze et al. | |

FOREIGN PATENT DOCUMENTS

| | | | | |
|---|---|---|---|---|
| CN | 103373542 A | | 10/2013 | |
| DE | 10 2005 050867 A1 | | 4/2007 | |
| DE | 10 2008 056860 A1 | | 5/2010 | |
| DE | 10 2012 103520 A1 | | 10/2013 | |
| DE | 10 2012 217430 A1 | | 3/2014 | |
| EP | 1 385 073 A1 | | 1/2004 | |
| EP | 2341224 A1 | | 7/2011 | |
| EP | 2 375 854 | * | 10/2011 | ........... H05B 1/0236 |
| EP | 2 549 072 | * | 1/2013 | ........... F01N 3/2013 |
| EP | 2 650 497 A1 | | 10/2013 | |
| JP | S5311327 A | | 2/1978 | |
| JP | 2001029474 A | | 2/2001 | |
| JP | 2013-517411 | | 5/2013 | |
| JP | 2013522515 A | | 6/2013 | |
| JP | 2013522584 A | | 6/2013 | |
| JP | 2013532253 A | | 8/2013 | |
| JP | 2014507596 A | | 3/2014 | |
| KR | 20100080522 A | | 7/2010 | |
| KR | 20130115175 A | | 10/2013 | |

OTHER PUBLICATIONS

International Search Report and Written Opinion dated Jul. 29, 2015 from corresponding International Patent Application No. PCT/EP2015/062290.

* cited by examiner

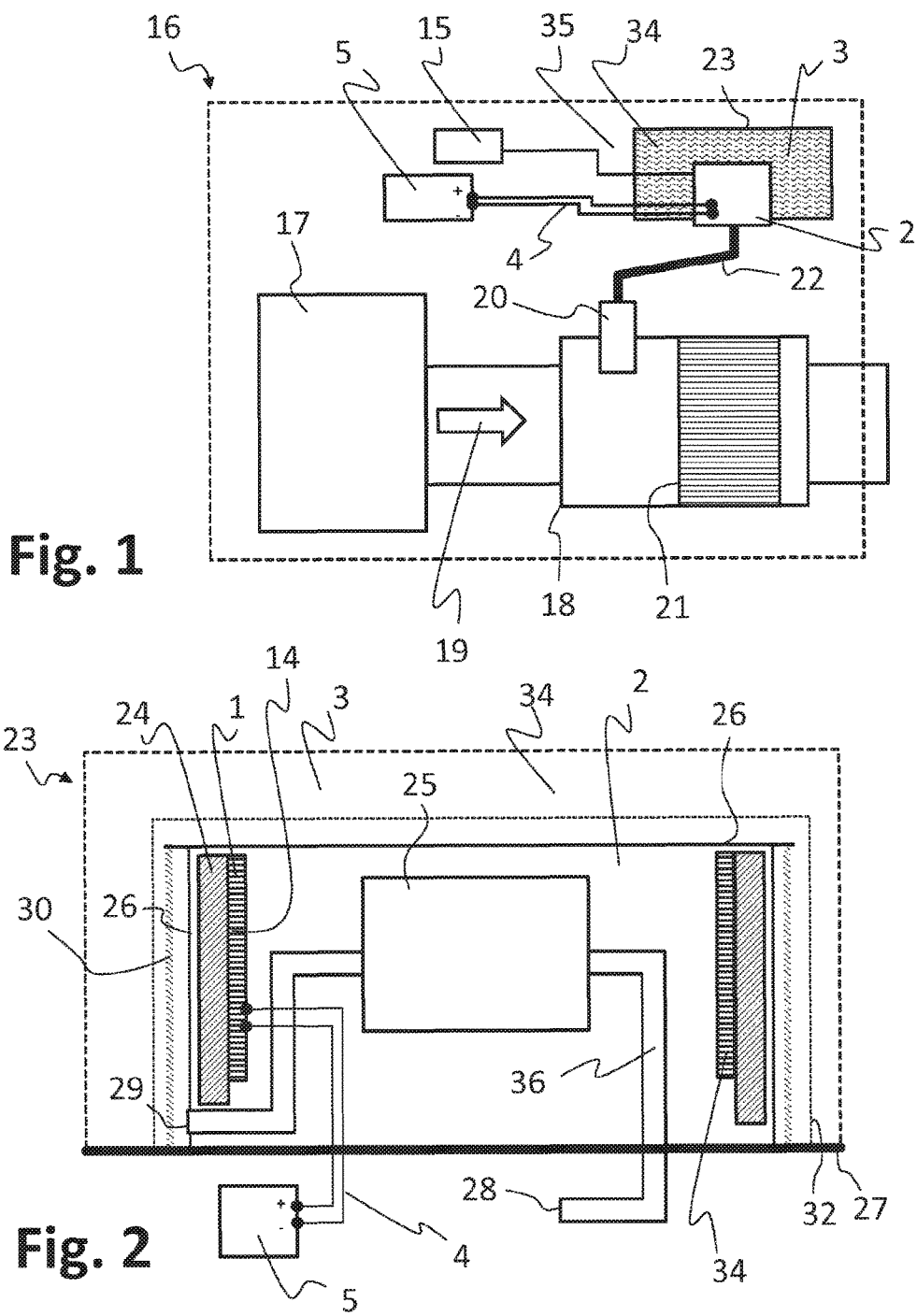

METHOD FOR CHECKING THE FUNCTION OF AT LEAST ONE PTC HEATING ELEMENT

CROSS-REFERENCE TO RELATED APPLICATIONS

This application claims the benefit of PCT Application PCT/EP2015/062291, filed Jun. 2, 2015, which claims priority to German Application DE 10 2014 107 863.2, filed Jun. 4, 2014. The disclosures of the above applications are incorporated herein by reference.

FIELD OF THE INVENTION

The invention relates to a method for checking the function of at least one PTC heating element which is used in a device for providing a liquid additive.

BACKGROUND OF THE INVENTION

Devices for providing a liquid additive are used, for example, in the field of motor vehicles in order to feed a liquid additive to an exhaust gas treatment device for purifying the exhaust gases of an internal combustion engine of the motor vehicle. Exhaust gas treatment devices in which a liquid additive is used for the purification of exhaust gases are widespread. An exhaust gas purification method which is carried out particularly frequently in such exhaust gas treatment devices is the method of selective catalytic reduction (SCR method). In this method, nitrogen oxide compounds in the exhaust gas are reduced using a reducing agent. In this context, ammonia is typically used as the reducing agent. The exhaust gas treatment device typically has an SCR catalytic converter at which the nitrogen oxide compounds in the exhaust gas are reduced using the ammonia. Ammonia is generally not stored directly in motor vehicles but instead in the form of a reducing agent precursor solution. This reducing agent precursor solution is a liquid additive. A particularly frequently used reducing agent precursor solution is a urea/water solution. A 32.5% urea/water solution is available with the tradename AdBlue®.

In the case of an operational start of such a device, it is problematic that this liquid additive can freeze at low temperatures. The urea/water solution described above freezes, for example, at −11° C. Such low temperatures can occur, in particular, during a long phase of deactivation of the motor vehicle. After a long phase of deactivation the liquid additive in the device may have completely frozen. The device is then initially incapable of providing any liquid additive. It is known that devices for providing liquid additive have a heating system for melting frozen liquid additive, so that liquid additive can be provided promptly after the operational start.

In particular PTC heating elements (PTC=Positive Temperature Coefficient) are proposed as the means of heating such devices. PTC heating elements are electric heating elements which are heated by a through-flowing electric current. They have the additional property that the electrical resistance of the current increases as the temperature rises. It is therefore ensured that the electric current is automatically reduced at high temperatures. As a result of the reduction in the electric current, the heating capacity is also reduced. This constitutes an automatic protection of a PTC heating element against overheating.

In these devices with PTC heating elements, insufficient conduction away of the heat from the PTC heating element is problematic, since the PTC heating element heats up to a high temperature within a short time and subsequently only conducts a small electric current. The heating capacity is therefore limited in a self-regulating fashion within a short time, with the result that the desired heating function is satisfied only to a small degree.

SUMMARY OF THE INVENTION

It is there fore an object of the present invention to solve, or at least alleviate, the technical problems described in conjunction with the prior art. The invention is to propose, in particular, a particularly advantageous method for checking the function of at least one PTC heating element.

These objects are achieved with a method according to the features of patent claim 1. Further advantageous refinements of the invention are specified in the dependently formulated patent claims. These features which are disclosed individually in the patent claims can be combined with one another in any desired technically appropriate way and may be supplemented with explanatory contents from the description, with further embodiment variants of the invention being indicated.

The method according to the invention for checking the function of at least one PTC heating element, wherein the at least one PTC heating element is used in a device for providing a liquid additive and is connected to a voltage source via electric conductors, comprises at least the following steps:

a) providing a switch-on current with a first value (of x amperes) at a predetermined operating voltage (of y volts); and then b) monitoring whether the switch-on current with the first value (x amperes) is provided for a minimum duration (of z s [seconds]), wherein the minimum duration (z) is at least 5 seconds, preferably at least 10 seconds.

In particular, a PTC heating element is connected in the device in a heat-conducting fashion to a heat-conducting structure, with the result that the heat is distributed from the PTC heating element and toward the liquid additive via the heat-conducting structure. The heating function of the PTC heating element with respect to the liquid additive is directly dependent here on the conduction away of the heat from the PTC heating element. Insufficient conduction away of the heat gives rise to a situation in which the PTC heating element reaches a high temperature within a short time, with the result that the heating capacity is limited in a self-regulating fashion within a short time and the desired heating function is satisfied only to a small degree then.

The PTC heating element is an electric heating conductor, also referred to as a PTC thermistor. In a PTC heating element, the electrical resistance is significantly smaller at low temperatures than at relatively high temperatures. The electrical conductivity is therefore significantly higher at low temperatures. Hence the German designation "Kaltleiter [cold conductor]". The electrical resistance at low temperatures is preferably approximately constant and then rises strongly starting from a rated temperature. Starting from a final temperature, the electrical resistance is then constant again at a high level.

A PTC heating element is preferably operated with a permanently predefined heating voltage of, for example, 12 volts or 24 volts. Owing to the temperature-dependence of the electrical resistance, the flow of current through the PTC heating element adapts itself automatically in the case of a permanently predefined heating voltage and in the case of a rising temperature. The heating capacity of the PTC heating element therefore also drops, with the result that further heating to even higher temperatures no longer occurs. A PTC heating element is therefore self-regulating in a relatively narrow temperature range. A PTC heating element for a device for providing liquid additive is preferably self-regulating in a narrowly delimited temperature range. The temperature range of the at least one PTC heating element is preferably between 10° C. [degrees Celsius] and 80° C. The temperature terms 10° C. and 80° C. define here a maximum upper limit and a minimum lower limit of the temperature range. The temperature ranges in the case of suitable PTC heating elements are, for example, between 20° C. and 30° C. or between 30° C. and 50° C. or between 50° C. and 60° C. Starting from approximately 10° C. effective melting of frozen liquid additive is possible. Starting from approximately 80° C. there is the risk of chemical conversion of the liquid additive, with the result that temperatures above 80° C. should be avoided. Within the limits of 10° C. and 80° C., relatively high temperatures permit particularly rapid thawing of frozen liquid additive, because at high temperatures the heat which is produced penetrates the frozen liquid additive particularly quickly. Low temperatures permit particularly uniform thawing of frozen liquid additive because relatively small local temperature peaks occur at low temperatures. At the same time, energy losses during the thawing process can be avoided with low temperatures.

In particular, in step a) a switch-on current is provided at a predetermined operating voltage (of y volts), wherein in step b) it is monitored whether the switch-on current reaches (or exceeds) the first value (x amperes) and whether at least the first value (that is to say x amperes or higher) is provided for a minimum duration.

In particular, the method is suitable for the initial putting into service in the motor vehicle and/or for checking the function after the device has been mounted. However, the method can also be carried out after a cold start of the internal combustion engine (in the usual operating mode of the motor vehicle). For example, the method can also be carried out whenever an internal combustion engine of a motor vehicle is activated. Therefore, the heating function of the PTC heating element can be checked during the manufacture of the device or of the motor vehicle or during the time of use of the motor vehicle (e.g. after a cold start or in the case of checking within the scope of a vehicle inspection). Given a fault-free thermally conductive connection of the PTC heating element to a heat-conducting structure and/or to a housing in which the frozen/liquid additive is stored, heat is conducted away from the PTC heating element in a predeterminable fashion. The switch-on current is then taken up by the PTC heating element for a predefined minimum duration, and is converted at least partially into heat without the PTC heating element reaching such a high temperature at which, as a result of the increase in the electrical resistance of the PTC heating element, the current drain is limited to a value which is less than the switch-on current.

As a result of the monitoring of the electric current, it is therefore possible for OBD (on-board diagnosis) to take place in the motor vehicle itself or on the assembled device (even before installation in the motor vehicle). In this context it is not necessary to use further sensors. In particular, it is not necessary to carry out a separate test method. The method according to the invention can be carried out, in particular, within the scope of the customary operation of the device (i.e. with the parameters which are provided for the normal operating mode).

The method is particularly advantageous if a malfunction of the at least one PTC heating element is detected according to step b). The malfunction is present if the switch-on current undershoots the first value during the minimum duration.

If a plurality of PTC heating elements are present in the device, it is possible to detect with the monitoring in step b), in particular, whether all the PTC heating elements of the device (as provided) are operating.

The following parameters can be used, for example:

First value x: 10 amperes, in particular between 5 and 15 A

Operating voltage y: 12, 24 or 48 volts, in particular between 12 and 48 V, and

Minimum duration z: 5 seconds, in particular between 10 and 30 s.

According to one advantageous development, the method comprises at least the additional steps following step b):

c) checking whether, during the passing of a checking time since step a) an electric current is provided continuously; and then d) checking whether after the expiry of a checking time (of a seconds) an electric operating current with at least one second value (of at least b amperes) is provided according to step a), wherein the following applies: checking time (a)>minimum duration (z).

It is particularly advantageous that according to step d) it is detected that conduction away of heat from the at least one PTC heating element is faulty if the electric operating current undershoots the second value.

In a further embodiment variant of the method, according to step d) at least one of the following faults is detected in the device if the electric operating current undershoots the second value of b amperes:

a faulty heat-conducting connection of amperes at least one PTC heating element of the device,
 a faulty heat-conducting connection of at least one heat-conducting structure of the device, and
 fractures in a heat-conducting structure or in the housing of the device.

This is an inconclusive enumeration of possible causes of insufficient conduction away of heat from the at least one PTC heating element. The conduction away of heat through the heat-conducting structure or through the housing may be interrupted or impeded by fractures in the heat-conducting structure or the housing because the flow of heat through the housing or through the heat-conducting structure is interrupted. Incorrect connection of the heat-conducting structure or of the at least one PTC heating element can adversely affect the conduction away of heat from the at least one PTC heating element as a result of an interruption in the flow of heat at a heat transfer face between the described components (PTC heating element, heat-conducting structure or housing).

Step c) and d) represent expanded function checking. It is checked here whether the heat generated in the PTC heating element is conducted away sufficiently even after a relatively long time period. Here, it is a precondition of step d) that according to step c) it is checked and detected that an electric current (>0 amperes; in particular >b amperes) has been taken up by the PTC heating element continuously (without an interruption since the start of step a)). A checking time is established for step d), wherein the following applies: checking time>minimum duration. The checking time starts with the provision of the switch-on current according to step a). After the expiry of the checking time, the electric operating current which is taken up by the PTC heating element is determined and compared with a predefined second value. The second value for the electric operating current is denoted here by "b". If the operating current is at least b amperes at the expiry of the checking time, the heat-conducting connection between the PTC heating element and the heat-conducting structure or between the PTC heating element and the housing in which the frozen/liquid additive is stored performs the function which is provided, wherein the function which is provided describes here, in particular, the successful and continuous conduction away of heat. In order to perform this function, it is necessary, in particular, for the connection of a heat-conducting structure to the at least one PTC heating element and/or the connection of a housing of the device to the at least one PTC heating element or to a heat-conducting structure to be configured suitably. If the function is performed as provided, repair or replacement of components is not necessary.

The following parameters can be used, for example, for steps c) and d):

Checking time a: between 100 and 480 seconds, in particular 300 s;

Operating current b: between 4 and 10 A, in particular 6 amperes.

In particular it is proposed that reference values for specific parameters are determined and/or predefined for the method, with the result that a device (even outside a motor vehicle, specifically within a test arrangement) can easily be checked with respect to the heating function of at least one PTC heating element. These parameters are, in particular, first value of the current strength of the switch-on current, operating voltage, minimum duration of the taking up of the switch-on current, checking time, operating current.

In particular, in the method at least one operating parameter of the device is taken into account at least for one of the steps b) and d), wherein the device comprises the following operating parameters:

temperature of the (frozen) liquid additive;
ambient temperature of the device;
temperature of the at least one PTC heating element;
start-up current of the pump (that is to say electric current taken up by the pump after the switching on of the pump, which electric current permits a conclusion to be drawn about the aggregate state of the additive, that is to say e.g. liquid or frozen);
use of the value of the filling level determined last for the liquid additive in the tank and determination of the heating energy [Joule] which is made available by the at least one PTC heating element, after the switching on and continuous operation of the at least one PTC heating element.

The values of the operating parameters can be determined, in particular, continuously or respectively before or at the same time as at least steps b) and d). The temperature of the liquid additive is determined, in particular, within a tank of the device. The ambient temperature is the temperature of the surroundings which acts on the device (that is to say the temperature in the region of the motor vehicle in which the device is arranged; the temperature of the surroundings in which the device for carrying out the method is arranged; etc.). The temperature of the PTC heating element can be determined directly at the PTC heating element or indirectly by means of the heat-conducting structure or electric current consumption.

In particular, a voltage source is used which can make available a maximum electric power of less than 200 watts. The maximum electric power of the power supply source is preferably between 72 watts and 144 watts. In the case of an available voltage of 12 volts, this corresponds to a maximum available current of between 6 amperes and 12 amperes. The at least one PTC heating element is preferably configured in such a way that it is possible to carry out the described method with a voltage source with the specified maximum electric power.

In particular, it possible that at least one of the specified values x, y, z, a and b is adapted as a function of the temperature. Furthermore, adaptation of at least one of the values x, y, z, a and b as a function of the ambient temperature is possible. Furthermore, it is possible to adapt at least one of the values x, y, z, a and b as a function of a temperature of the at least one PTC heating element.

A device is also proposed for providing a liquid additive and which has at least one PTC heating element which is configured to melt frozen liquid additive in the device, wherein the device is connected to a monitoring unit which is suitable for carrying out the method according to the invention.

The particular advantages and refinement features which are presented with the described method can be applied and transferred in an analogous fashion to the described device. The same is true for the particular advantages and refinement features of the device which are presented below and which can be applied and transferred in an analogous fashion to the described method.

The device is preferably used in a tank as an installation unit. The device preferably has a housing and is arranged on the tank floor of the tank. The device has, in particular, an intake point at which liquid additive (in particular urea-water solution) can be extracted from the tank. Furthermore, the device preferably has a line connection to which a feed line for providing the liquid additive can be connected. A duct usually runs through the device from the intake point to the line connection. A pump with which the liquid additive can be fed is arranged in the duct. The device has a plurality of PTC heating elements. The PTC heating elements are connected by a heat-conducting structure to the housing of the tank. In the tank there is a starting volume of liquid additive around the device. The PTC heating elements are configured to heat liquid additive in the starting volume passing through the housing of the device. The heat-conducting structure preferably bears over a large surface on the housing so that the liquid in the tank can be effectively heated using the at least one PTC heating element. The PTC heating elements (and usually also the pump of the device) are supplied with electric current and an electric voltage by a voltage source of the device via electric leads.

A filter which limits the starting volume between the filter and the housing and covers the intake point is optionally also arranged around the outside of the housing, with the result that when the liquid additive is extracted from the tank it is filtered with the filter. A further coarse filter, which can prevent damage to the filter, is optionally arranged around the outside of the housing and outside the filter. The liquid additive inside the tank (outside the coarse filter) is at a temperature. This temperature is an operating parameter of the device which can be taken into account during the execution of the method.

The connection of the at least one PTC heating element of the device to a heat-conducting structure of the device is particularly important for the described method and the described device. This connection may be checked effectively, in particular, using step d) of the described method.

In addition, a motor vehicle is proposed which has an internal combustion engine, an exhaust gas treatment device for purifying the exhaust gases of the internal combustion engine and a device according to the invention for providing a liquid additive for the exhaust gas treatment device.

An SCR catalytic converter, with which the method of the selective catalytic reduction can be carried out, is preferably arranged in the exhaust gas treatment device. The described device is preferably connected to a feed line. This feed line leads to a feed device with which the liquid additive can be fed to the exhaust gas treatment device. The feed device preferably has for this purpose a nozzle which finely atomizes the liquid additive in the exhaust gas treatment device (if appropriate using a pressure medium such as air) and/or an injector with which the liquid additive can be metered. The injector can be, for example, an electrically opening and closing valve.

The invention and the technical environment are explained in more detail below with reference to the figures. The figures show particularly preferred exemplary embodiments to which the invention is, however, not limited. In particular, it is to be noted that the figures and, in particular, the illustrated size relationships are only schematic.

BRIEF DESCRIPTION OF THE DRAWINGS

The present invention will become more fully understood from the detailed description and the accompanying drawings, wherein:

FIG. 1 shows a motor vehicle having a device;
FIG. 2 shows a tank having a device.

DETAILED DESCRIPTION OF THE PREFERRED EMBODIMENTS

Figure 3:
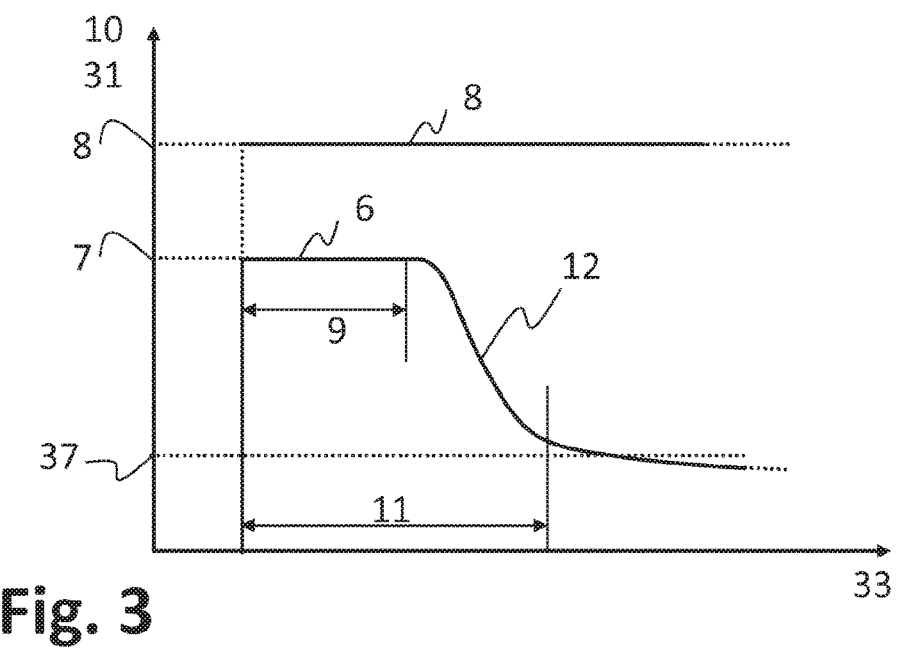
FIG. 3 shows a current/voltage and time diagram.

The following description of the preferred embodiment(s) is merely exemplary in nature and is in no way intended to limit the invention, its application, or uses.

FIG. 1 shows a motor vehicle 16 having an internal combustion engine 17 and an exhaust gas treatment device 18 for purifying the exhaust gases 19 of the internal combustion engine 17. An SCR catalytic converter is provided as an exhaust gas purification component 21 in the exhaust gas treatment device 18. A feed device 20, with which the liquid additive 3 can be fed to the exhaust gas purification component 21, is arranged on the exhaust gas treatment device 18. The feed device 20 is supplied with liquid additive 3 from a tank 23 by a device 2 via a feed line 22. The liquid additive 3 is at a temperature 34 which is marked here by way of example in the tank 23. The device 2 is arranged in an environment (e.g. in the vicinity of the fuel tank of the motor vehicle), wherein the environment has an ambient temperature 35 which is marked here by way of example outside the tank 23. Inter alia, PTC heating elements (not shown here) are arranged in the device 2 and are connected to a voltage source 5 via electric leads 4. The device 2 is connected to a monitoring unit 15.

FIG. 2 shows a tank 23 in a side view in which a device 2 is inserted as an installation unit. The device 2 has a housing 26 and is arranged on the tank floor 27 of the tank 23. The device 2 has an intake point 29 at which liquid additive 3 (in particular urea/water solution) can be extracted from the tank 23. Furthermore, the device 2 has a line connection 28 to which a feed line 22 for providing the liquid additive 3 can be connected. A duct 36 runs through the device 2 from the intake point 29 to the line connection 28. A pump 25, with which the liquid additive 3 can be fed, is arranged in the duct 36. The device 2 has a plurality of PTC heating elements 1. The PTC heating elements 1 are connected to the housing 26 of the tank 23 with a heat-conducting structure 24. A starting volume of liquid additive 3 is located around the device 2 in the tank 23. The PTC heating elements 1 are configured to heat liquid additive 3 in the starting volume passing through the housing 26 of the device 2. The PTC heating elements 1 (and the pump 25) are supplied with electric current 10 and an electric voltage 31 by a voltage source 5 of the device 2 via electric leads 4. A filter 30, which limits the starting volume between the filter 30 and the housing 26 and covers the intake point 29, with the result that the liquid additive 3 is filtered with the filter 30 as it is extracted from the tank 23, is optionally also arranged around the outside of the housing 26. A further coarse filter 32, which can prevent damage to the filter 30, is optionally arranged around the outside of the housing 26 and outside the filter 30. The liquid additive 3 inside the tank 23 (outside the coarse filter 32) is at a temperature 34. This temperature 34 is an operating parameter 14 of the device 2 which can be taken into account during the execution of the method.

FIG. 3 shows a current/voltage and time diagram. Electric current 10 and electric voltage 31 are plotted on the vertical axis, and the time 33 is plotted on the horizontal axis. A switch-on current 6 with a first value 7 (e.g. 10 amperes) is provided to the PTC heating element 1 via a voltage source 5 at an operating voltage 8 (e.g. 12 volts) at a specific time (step a)). According to step b) of the method for checking the function of the PTC heating element 1, it is monitored whether the switch-on current 6 is provided for a minimum duration 9 of z seconds (e.g. 10 seconds). If this is not the case, there is probably a faulty connection of the PTC heating element 1 to the heat-conducting structure 24. The device 2 would then have to be checked and/or repaired. In the present diagram, the minimum duration 9 is, however, exceeded, with the result that it is to be assumed that a fully functionally capable heat-conducting connection is present between the PTC heating element 1 and the heat-conducting structure 24 and between the heat-conducting structure 24 and the housing 26 of the tank 23.

According to step c) of the method it is checked whether an electric current 10 has been provided continuously since the provision of the switch-on current 6 (step a)). If this is the case, it is checked in step d) whether after the expiry of a checking time 11 (e.g. after 300 seconds, calculated from the provision of the switch-on current 6 an electric operating current 12 with at least one second value 37 of at least b amperes (e.g. 6 amperes) is provided. If a lower electric operating current 12 is therefore taken up than b amperes by the PTC heating element after continuous current consumption (step c)) and after the expiry of the checking time 11, it is also to be assumed that there is probably a faulty connection of the PTC heating element 1 to the heat-conducting structure 24. In this case, the conducting away of the heat from the PTC heating element 1 via the heat-conducting structure 24 to the liquid additive 3 is also not sufficient, with the result that the temperature 34 of the PTC heating element 1 rises quickly. However, as the temperature 34 of the PTC heating element 1 rises, the electrical resistance also rises, with the result that the electric current 10 taken up by the PTC heating element 1 is reduced. However, in the present diagram, the PTC heating element 1 takes up an electric operating current 12 with more than b amperes after the expiry of the checking time 11, and it is therefore to be assumed that there is a fully functionally capable heat-conducting connection between the PTC heating element 1 and the heat-conducting structure 24 or between the heat-conducting structure 24 and the housing 26 of the tank 23.

The invention permits particularly advantageous operation of a device for providing liquid additive. In particular, checking of the function of the heat-conducting connection of PTC heating elements 1 to heat-conducting structures 24 and/or a housing 26 is possible. As a result it can be determined whether there is a need, under certain circumstances, for improvements or repairs (and possibly also for replacement of the device).

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A method for checking the function of at least one Positive Temperature Coefficient (PTC) heating element which is used in a device for providing a liquid additive, comprising the steps of:
   providing at least one PTC heating element;
   providing a voltage source, the voltage source being connected to the at least one PTC heating element via electric conductors;
   providing a first value of current;
   providing a switch-on current equivalent to the first value of current at a predetermined operating voltage;
   providing a minimum duration of time; and
   monitoring whether the switch-on current with the first value is provided for the minimum duration of time, wherein the minimum duration is at least five seconds;
   detecting a malfunction of the at least one PTC heating element if the switch-on current undershoots the first value during the minimum duration.

2. The method of claim 1, further comprising the steps of detecting a malfunction of the at least one PTC heating element if the switch-on current undershoots the first value during the minimum duration.

3. The method of claim 1, further comprising the steps of:
   providing a checking time;
   checking whether an electric current is provided continuously during the checking time; and
   providing an electric operating current having at least one second value;
   measuring the at least one second value of the electric operating current after the duration of the checking time, and determining if the checking time is greater than the minimum duration.

4. The method of claim 3, further comprising the steps of: detecting that the conduction of heat away t from the at least one PTC heating element is insufficient if the electric operating current undershoots the second value.

5. The method of claim 4, further comprising the steps of: detecting at least one fault in the device if the electric operating current undershoots the second value.

6. The method of claim 3, further comprising the steps of:
   providing the device with at least one operating parameter;
   selecting the operating parameter from one consisting of:
   temperature of the liquid additive;
   ambient temperature of the device; and
   temperature of the at least one PTC heating element.

7. A device for providing a liquid additive, comprising:
   at least one Positive Temperature Coefficient (PTC) heating element which is configured to melt frozen liquid additive in the device, the device is being connected to a monitoring unit;
   a voltage source, the voltage source being connected to the at least one PTC heating element via electric conductors;
   a first value of current;
   a switch-on current equivalent to the first value of current at a predetermined operating voltage; and
   wherein the switch-on current is monitored to determine if the switch-on current is provided for at least five seconds, and a malfunction of the at least one PTC heating element is detected if the switch-on current undershoots the first value during the at least five seconds.

8. The device of claim 7, further comprising:
   an internal combustion engine; and
   an exhaust gas treatment device for purifying the exhaust gases of the internal combustion engine;
   wherein the device provides a liquid additive for the exhaust gas treatment device.

9. The method of claim 5, further comprising the steps of selecting the at least one fault from the group consisting of a faulty heat-conducting connection of the at least one PTC heating element of the device, a faulty heat-conducting connection of at least one heat-conducting structure of the device, and fractures in a heat-conducting structure or a housing of the device.

* * * * *